United States Patent [19]

Wheable

[11] Patent Number: 4,592,665
[45] Date of Patent: Jun. 3, 1986

[54] TEMPERATURE-CONTROLLED SYSTEMS FOR NON-THERMAL PARAMETER MEASUREMENTS

[75] Inventor: Desmond Wheable, Basingstoke, Great Britain

[73] Assignee: Transamerica Delaval Inc., Lawrenceville, N.J.

[21] Appl. No.: 610,138

[22] Filed: May 14, 1984

[30] Foreign Application Priority Data

May 27, 1983 [GB] United Kingdom ............. 8314846

[51] Int. Cl.$^4$ .................................................. G01K 1/08
[52] U.S. Cl. ....................................... 374/143; 374/164; 73/708
[58] Field of Search ................. 73/708, 720, 721, 726, 73/727; 374/164, 173, 141, 142, 143

[56] References Cited

U.S. PATENT DOCUMENTS

| | | | |
|---|---|---|---|
| 3,286,526 | 11/1966 | Mulcahy et al. | 73/708 |
| 3,372,577 | 3/1968 | Bates et al. | 73/726 |
| 3,527,099 | 9/1970 | Herceg | 73/708 |
| 4,198,868 | 4/1980 | Runyan | 73/708 |
| 4,366,714 | 1/1983 | Adorni | 73/708 |
| 4,480,478 | 11/1984 | Sato et al. | 73/708 |

FOREIGN PATENT DOCUMENTS 1267848  3/1972  United Kingdom .
1431039  4/1976  United Kingdom .

Primary Examiner—Robert I. Smith
Assistant Examiner—David R. Schuster
Attorney, Agent, or Firm—Benoit Law Corporation

[57] ABSTRACT

Methods and apparatus for measuring a non-thermal physical parameter with temperature sensitive elements impart a predetermined temperature sensitive elements, while measuring the physical parameter therewith. The same termperature-sensitive elements are employed for effecting a measurement of environmental temperature variation, and such temperature-sensitive elements are restored to their predetermined temperature in response to that measurement of environmental temperature variation effected with these temperature-sensitive elements.

23 Claims, 4 Drawing Figures

TEMPERATURE-CONTROLLED SYSTEMS FOR NON-THERMAL PARAMETER MEASUREMENTS

BACKGROUND OF THE INVENTION

This invention relates to temperature-controlled electronic devices such as temperature-controlled resistance strain gauge bridges.

The concept of controlling the temperature of an electronic device to minimize a change in the characteristics of the device with temperature, hereinafter referred to as thermal shifts, is well known.

A known pressure transducer comprises a silicon diaphragm having a four-arm, active, resistance strain gauge bridge formed thereon, the four resistors of the bridge being diffused into the silicon diaghragm at the areas of maximum strain. A constant current, or a current fed by way of a resistor from a source of a constant voltage is applied to opposed first and second junctions of the bridge. If the resistance of the resistors in the bridge remains constant the voltage between the first and second junctions also remains constant. A strain in the diaphragm due to an applied pressure or force results in a change in the resistance of the bridge resistors and this change is detected by detection means coupled to the third and fourth opposed junctions. The detection means would often include an amplifier and the output of the bridge could be expressed in a current per unit pressure or force.

If the temperature of the device remains constant then the resistance of the resistors and hence the output of the bridge for a given strain in the transducer would remain constant provided that the strain coefficients of the bridge strain gauge resistors are matched.

However, if the temperature of the diaphragm changes due to changes in operating and/or ambient temperature then the values of the bridge resistors will change with a corresponding change in the voltage across the first and second junctions of the bridge and this is manifested as an error in the measured output signal.

Any change in temperature could also affect the operation of other associated devices, such as the measuring amplifier which would result in a change in the amplifier offset voltage, drift in the amplifier output signal and the like.

It is therefore important to maintain constant the temperature of such electronic devices or to provide some means of compensating for temperature change.

One known pressure transducer comprising a silicon diaghragm and a four arm active bridge as hereinbefore mentioned includes two other sets of silicon resistors deposited on the substrate in a non-active area. One temperature measuring set of the resistors is arranged to provide a signal representative of the temperature of the diaphragm to the input of an amplifier, the output of which is arranged to provide an output current to the other, heating set of resistors thereby to heat the diaphragm and to maintain it at a predetermined temperature. A control feedback loop is provided in known manner between the output and input of the amplifier to maintain the temperature substantially constant and to prevent fluctuations about the predetermined temperature.

This known arrangement maintains the temperature of the diaphragm approximately constant and reduces errors in the output of the bridge. However, as the temperature control is determined by the temperature sensing resistors on the non-active area of the diaphragm, temperature gradients across the silicon substrate and variations of these temperature gradients with ambient temperature limit the accuracy to which the temperature of the active area of the diaphragm can be controlled.

SUMMARY OF THE INVENTION

It is a general object of this invention to overcome the problems and meet the needs expressed or implicit in the above background of the invention or in other parts hereof.

It is a germane object of this invention to provide improved temperature-controlled systems for measuring non-thermal parameters.

It is also an object of this invention to provide improved transducer systems.

Other objects will become apparent in the further course of this disclosure.

From a first aspect thereof, the subject invention resides in a method of measuring a non-thermal physical parameter with temperature-sensitive means arranged in a bridge circuit including input terminals, and, more specifically, resides in the improvement comprising the steps of providing a constant voltage, deriving a constant current from the constant voltage, applying the constant current to the input terminals of the bridge circuit, imparting a predetermined temperature to the temperature-sensitive means, measuring the physical parameter with the temperature-sensitive means, subjecting the temperature-sensitive means to temperature variation affecting the mentioned predetermined temperature, employing the temperature-sensitive means themselves for effecting a measurement of temperature variation by sensing a change in potential difference across the input terminals due to the temperature variation and providing a signal in response to the change in potential relative to the constant voltage, and continuously restoring the temperature-sensitive means to their predetermined temperature in response to the signal relative to the constant voltage.

From a related aspect thereof, the subject invention resides in apparatus for measuring a non-thermal physical parameter with temperature-sensitive means arranged in a bridge circuit including input terminals, and, more specifically, resides in the improvement comprising, in combination, first means for providing a constant voltage, second means connected to the first means for deriving a constant current from the constant voltage and for applying the constant current to the input terminal means of the bridge circuit, third means connected to the temperature-sensitive means for measuring the physical parameter with such temperature-sensitive means, fourth means for imparting a predetermined temperature to the temperature-sensitive means, such temperature-sensitive means being subject to temperature variation affecting the mentioned predetermined temperature, fifth means connected to the input terminal means of the bridge circuit for sensing a change in potential difference across the input terminal means due to the temperature variation with such temperature-sensitive means themselves and providing a signal in response to the change in potential relative to the constant voltage, and sixth means connected to the fourth and fifth means for continuously restoring the temperature-sensitive means to their predetermined temperature in response to the signal relative to the constant voltage to restore the temperature sensitive means to the predetermined temperature.

Other objects of the invention will become more fully apparent in the further course of this disclosure, and no restriction is intended by the subject Summary of the invention.

BRIEF DESCRIPTION OF THE DRAWINGS

The invention will now be described by way of example with reference to the accompanying drawings, in which.

DESCRIPTION OF PREFERRED EMBODIMENTS

Figure 1:
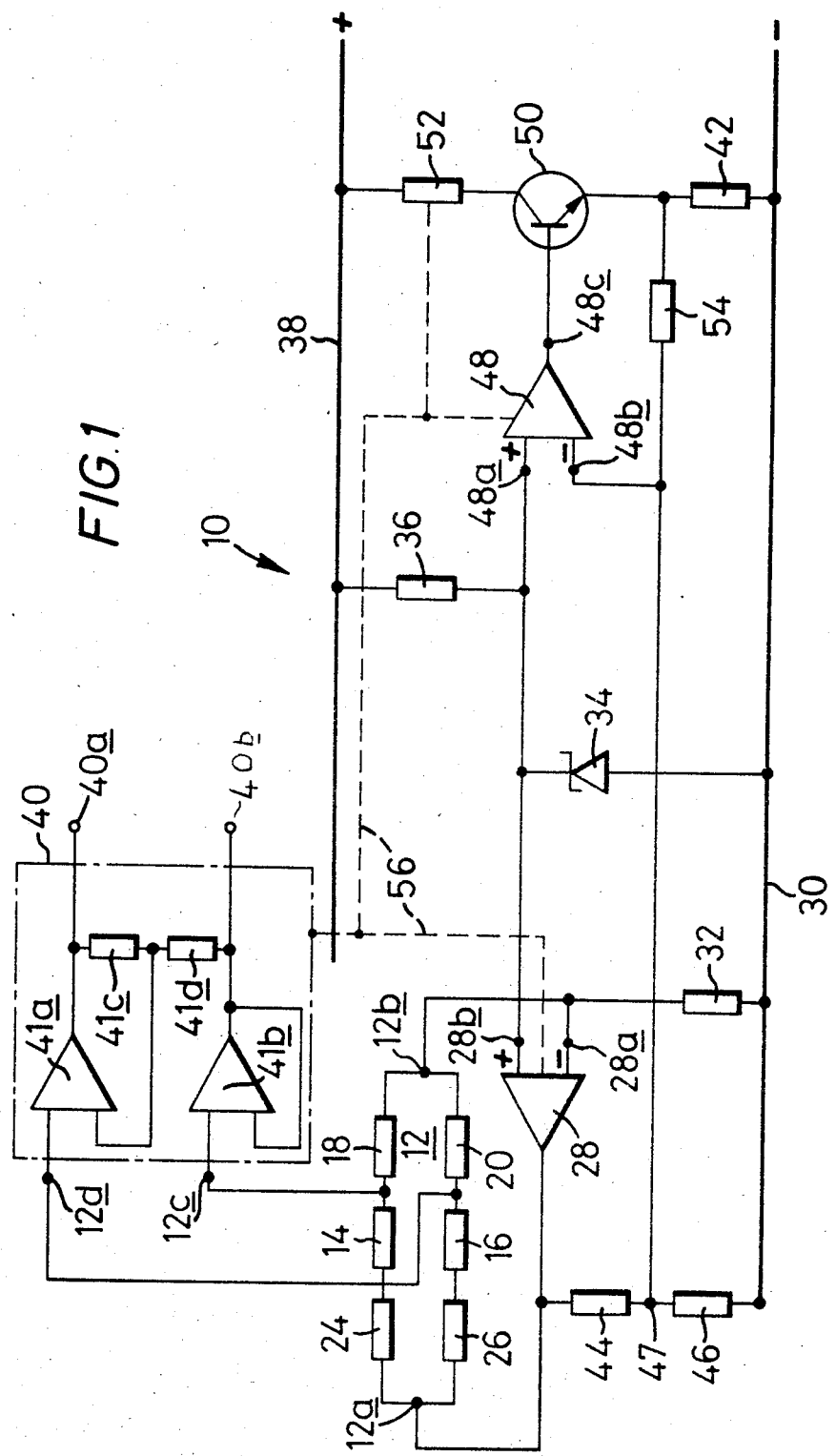
FIG. 1 is a block circuit diagram of one embodiment of the invention in the form of a four-arm active bridge and part of its control circuit.

Referring to the drawings, there is shown an electronic device 10 comprising a four-arm active strain gauge bridge 12 consisting of resistors 14, 16, 18, 20. The resistors 14, 16, 18, 20 are diffused into one surface 22a of a silicon diaphragm 22 at areas of maximum strain in the diaphragm 22 when it is stressed by a pressure or force applied, for example, to its other surface 22b.

A constant current is applied to first and second junctions 12a, 12b of the bridge 12 by way of resistors 24, 26 from an operational amplifier 28 having one, negative or inverting input 28a coupled to the negative power bus 30 by way of a resistor 32 and its other, positive or non-inverting input 28b coupled to a source of a reference voltage developed across a zener or band gap reference diode 34. The diode 34 is coupled as a potential divider with a resistor 36 between the negative power bus 30 and the positive power bus 38. A band gap diode, having a nominal 1.2 volts developed thereacross, has a very low temperature coefficient of voltage so that the potential applied to the input 28b of the amplifier 28 is substantially constant. If the temperature of the amplifier is maintained constant, then the current applied to the bridge by way of opposed junctions 12a, 12b will be maintained substantially constant provided the resistance of resistor 32 is maintained constant.

The output span of the bridge 12 can be adjusted by adjustment of the value of resistor 32 and the zero output of the bridge at junctions 12c, 12d can be adjusted by adjusting resistors 24 and 26.

If the temperature of the amplifier 28 and bridge resistors 14, 16, 18, 20 are maintained constant, then the output signal appearing at junctions 12c, 12d will depend on the strain induced in the bridge resistors by a pressure or force applied to the diaphragm 22. The junctions will usually be coupled to an amplifier circuit 40 having operational amplifiers 41a and 41b and output resistors 41c and 41d connected in an instrumentation amplifier configuration between bridge terminals 12c and 12d and output terminals 40a and 40b, hereinafter collectively referred to as output terminal 40a supplying what may be considered as the bridge output.

The device 10 can be subject to temperature change, due for example to changes in ambient temperature or to the power dissipated in the device. If the temperature of the diaphragm 22 changes then the concomitant change in the resistance of the bridge resistors will result in an error in the output of the bridge at output terminal 40a of the amplifier 40 and a change in the potential difference between terminals 12a and 12b. Likewise changes in the temperature of the amplifiers will result in drift and changes in their offset voltage and current temperature coefficients which will degrade the accuracy of the output of the bridge seen at the terminal 40a.

Figure 2:
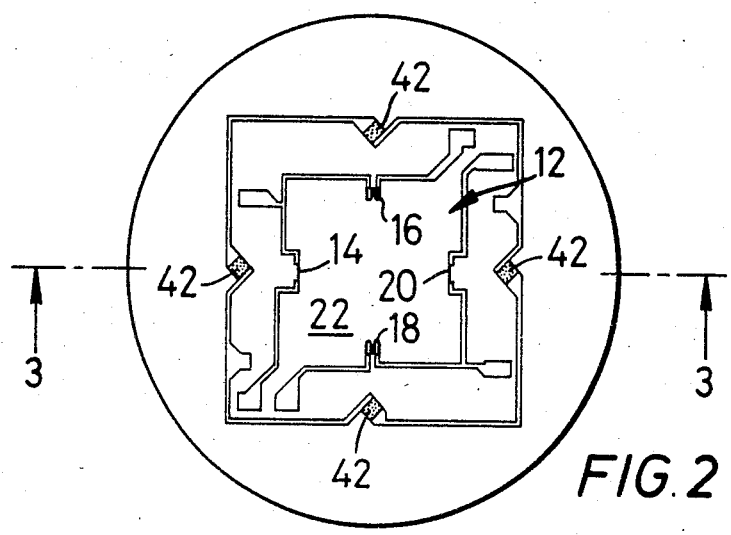
FIG. 2 is a diagrammatic plan view of a silicon diaphragm for use as part of a pressure or force transducer showing the bridge resistors and heating resistor of FIG. 1.

A resistor 42, shown in FIG. 2 as four resistors connected in series, is mounted on the non-active, outer peripheral area of the diaphragm 22 and is coupled as a controlled heater for the diaphragm.

Any change in the resistance of the resistors 14, 16, 18, 20 due to change in temperature will change the potential difference across the bridge measured between the terminals 12a and 12b. This change is sensed by a potential divider comprising resistors 44, 46 connected in series between the output of amplifier 28 and the negative bus 30. The values of the resistors 44, 46 are so chosen that the voltage at their junction 47 at a predetermined temperature is approximately equal to the voltage across diode 34, say about 1.2 volts.

The voltages across diode 34 and across resistor 46 are coupled to the positive or non-inverting and negative or inverting inputs 48a and 48b respectively of an operational amplifier 48. The output 48c of amplifier 48 is coupled to the base of an NPN transistor 50. A resistor 52 is connected in the collector circuit and the heating resistor 42 is connected in the emitter circuit of the transistor 50. A feedback resistor 54 is coupled between the emitter of transistor 50 and the negative input 48b of amplifier 48. This forms a temperature control circuit for the substrate. The feedback resistor 54 controls the loop gain around the temperature control circuit to maintain the temperature of the substrate substantially constant.

In operation, the value of the potential at junction 47, input 48b, is made such that the output of amplifier 48 causes the current flowing through transistor 50 to be controlled at such a value that at a predetermined ambient temperature, of say 20° C., the heat generated by the diffused resistor 42 on the silicon diaphragm maintains the bridge 12 resistors substantially constant at, say 80° C.

The bridge resistors 14, 16, 18, 20 have a positive temperature coefficient of resistance such that any increase in ambient temperature will increase the potential across the bridge 12 and hence across the resistor 46. This will reduce the potential difference at the input terminals 48a, 48b of the amplifier 48, and therefore the current through resistor 42. The heat generated by resistor 42 is thus reduced until the temperature of the bridge resistors and sensed by resistors 44, 46 and amplifier 48 is again at the required temperature of 80° C.

Conversely, if the ambient temperature drops below the predetermined value of 20° C., the amplifier 48 causes an increase in the current flow through transistor 50 to increase the heat generated by resistor 42 until the bridge resistor temperature is again at the required value of 80° C.

Thus by sensing the resistance change of the bridge resistors 14, 16, 18, 20 due to temperature change, the maintance of their actual temperature at a predetermined value can be achieved so much more precisely than if a separate temperature sensing resistor is used.

As aforementioned, the gain of the feedback loop around the amplifier is controlled by the value of the resistance of resistor 54.

Also as aforementioned, temperature changes in the amplifiers 28, 40, 48 can result in changes in the amplifiers' offset voltages, currents and drift which degrade the accuracy of the output of the bridge appearing at terminal 40a. The effects of these changes in ambient temperature can be reduced by using the temperature dissipated by the resistor 52. In accordance with one embodiment of this aspect of the invention and as indicated by dotted lines 56, the amplifiers are incorporated in a single chip, such as one known as a "quad-op amplifier" and the chip is mounted in heat-transfer relationship on a thick film resistor 52. As described in relation to heating resistor 42, the current through, and the heat dissipated by, resistor 52 increases and decreases as the ambient temperature decreases and increases respectively. Thus the range of the temperature changes of the amplifiers with changes in ambient temperature can be substantially reduced with a corresponding reduction in their offset voltages and current drifts. If the thermal characteristics of the resistor 52 and the amplifiers were the same as the substrate of diaphragm 22 then the temperature control of the amplifiers would match that of the bridge resistors. However, this is unlikely but nevertheless some measure of temperature control will be achieved.

Figure 4:
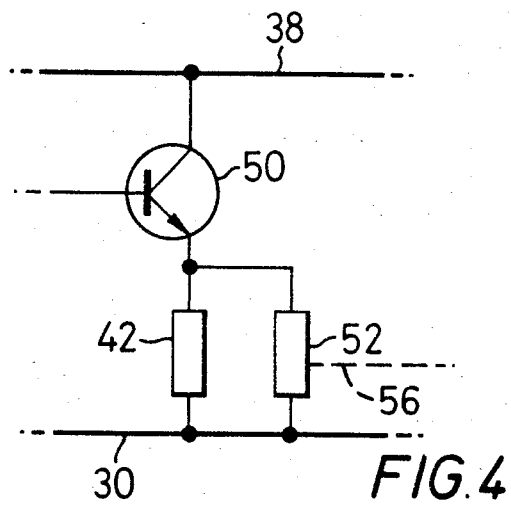
FIG. 4 shows a modification of part of the circuit of FIG. 1.

FIG. 4 shows a modification of the circuit of FIG. 1, wherein the resistor 52 is coupled in parallel with the heating resistor 42 in the emitter circuit of transistor 50. This circuit allows more flexibility in the control of the temperature of resistor 52 and therefore of the amplifiers 28, 40, 48 as it is possible to select its value.

The value of resistor 52 in FIG. 4 can be so selected that when the ambient temperature is, say 20° C., the current through resistor 52 is such that the temperature of the amplifiers is maintained at the same value as the bridge resistors, say 80° C. The amplifiers' drifts, offsets and the like will be known or determinable.

If the ambient temperature increases the current through transistor 50 and resistor 52 decreases so that the temperature of the amplifiers decreases. If the ambient temperature increases to the preferred value of 80° C. then the current through transistor 50 is reduced effectively to zero so that there is no heat transfer from resistor 52 to the amplifiers and they are at a temperature of 80° C. Thus at two widely spaced ambient temperatures, in this example 20° C. and 80° C., the amplifiers will be 80° C. so that their gains, offsets and the like are the same. Between, and beyond, the two selected temperatures of 20° C. and 80° C., the amplifier characteristics may not track the ambient temperature but they can be made to track within quite acceptable limits which are a substantial improvement over a circuit in which there is no temperature control of the amplifiers.

According to an embodiment of the invention there is provided an electronic device 10 comprising at least one resistive element 14,16,18,20 the temperature of which is to be controlled and the value of which is to be varied, in use, in dependence upon the magnitude of a physical parameter, other than temperature (referred to herein as "non-thermal parameter"), applied to the device, means 44,46, 48,50 for sensing the temperature of the resistive element or elements 14,16,18,20 and arranged to control the temperature of a heating resistor 42 electrically isolated from said resistive element or elements but in heat-transferring relation thereto such that the temperature of said resistive element or elements is maintained substantially constant.

The resistive elements may be a resistance bridge 12, such as a resistance strain gauge bridge.

The strain gauge bridge 12 may be on the active part of a diaphragm 22 to which a pressure or force to be measured is applied. The heating resistor 42 may be on a non-active part of the diaphragm such that it is not subject to strain due to the applied pressure or force which might change its resistance value.

The diaphragm 22 may be a silicon diaphragm with the strain gauge resistive elements 14, 16, 18, 20 diffused into the silicon at areas of maximum strain and they may be arranged as a four-arm active bridge.

The silicon diaphragm 22 may be made from a base material with a central, square portion 22b reduced in thickness to form the diaphragm with a relatively thick annular, peripheral portion 23. The strain gauge resistors would be positioned on the diaphragm at areas of maximum strain, that is near the junction of the diaphragm with the thick annular portion and the heating resistor 42 would be positioned on the annular portion 23. The heating resistor may be a single resistor, as shown in FIG. 1 at 42, which may extend around a substantial part of the annular portion or it may comprise a plurality of discrete resistors 42 arranged around the annular portion and connected together in series, as seen in FIG. 3

From one aspect thereof, the subject invention resides in a method of measuring a non-thermal physical parameter with temperature-sensitive means, comprising, in combination, the steps of imparting a predetermined temperature to the temperature-sensitive means, measuring said physical parameter with said temperature-sensitive means 14, 16, 18, 20, subjecting such temperature-sensitive means to environmental temperature variation affecting the mentioned predetermined temperature, employing an input, (12a, 12b) of the temperature-sensitve means 14, 16, 18, 20 themselves for effecting a measurement of environmental temperature variation and restoring the temperature-sensitive means to their predetermined temperature in response to the measurement of environmental temperature variation effected with an input of the temperature-sensitive means themselves.

According to a preferred embodiment of the invention, energizable means distinct from the temperature-sensitive means 14, 16, 18, 20 are provided for imparting the predetermined temperature to such temperature-sensitive means, and such distinct means 42 are energized in response to the measurement of environmental temperature variation effected with the temperature-sensitive means 14, 16, 18, 20 themselves to restore such temperature-sensitive means to their predetermined temperature. As seen in FIG. 2, the energizable distinct means 42 preferably are provided around the temperature-sensitive means 14, 16, 18, 20.

Figure 3:
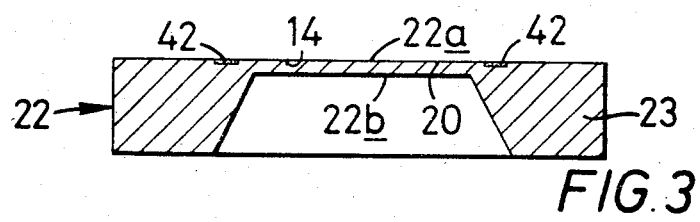
FIG. 3 is a section taken on the line 3—3 in FIG. 2.

As disclosed above with the aid of FIGS. 2 and 3, the non-thermal physical parameter is applied to the temperature-sensitive means within a predetermined region 22b, and the energizable distinct means 42 are placed into heat-transfer relationship with the temperature-sensitive means, but outside the predetermined region 22b.

According to the illustrated preferred embodiment of the subject invention, the disclosed temperature-sensitive means have or are provided with electrically energizable elements 14, 16, 18, 20 having a temperature coefficient, and the desired predetermined temperature is imparted to these elements. A constant energizing input is applied to the elements 14, 16, 18, 20 or bridge 12, such as shown at 28, 34, in FIG. 1. The non-thermal physical parameter is aplied to, and an output reflecting such physical parameter is derived from, the elements 14, 16, 18, 20. The desired measurement of environmental temperature variation is effected with the aid of an input voltage of the elements 14, 16, 18, 20 having the above mentioned constant energizing input applied thereto. As disclosed above, a voltage divider 44, 46 and amplifier 48 may be employed for that purpose. The elements 14, 16, 18, 20 are restored to their derived predetermined temperature in response to the latter measurement of environmental temperature variation effected with the aid of the input or input voltage across input terminals 12a and 12b.

In principle, the means for imposing a predetermined temperature may be heating or cooling means. According to the illustrated embodiment, the temperature-sensitive means 12 are heated to a predetermined temperature, and the non-thermal physical parameter is measured with such heated temperature-sensitive means 12. Also, such heated temperature-sensitive means are subjected to environmental temperature variation affecting the desired predetrmined temperature, and such heated temperature-sensitive means themselves are employed for effecting a measurement of environmental temperature variation. These temperature-sensitive means 12 are then restored to their predetermined temperature in response to measurement of environmental temperature variation effected with these heated temperature-sensitive means themselves.

As seen in FIG. 2, the distinct heater means 12 are provided around or encompass the temperature-sensitive means 12 or 14, 16, 18, 20.

As disclosed above with the aid of FIGS. 2 and 3, the strain gauge bridge 12 is located on areas of maximum strain of a diaphragm 22 for receiving the non-thermal physical parameter, and the heater elements 42 or other means for imparting the predetermined temperature to the strain gauge bridge are located outside of the maximum strain areas.

The means for restoring the temperature-sensitive elements 14, 16, 18, 20 or bridge 12 to their predetermined temperature may include an amplifier 48 connected between the means 44, 46 for effecting the measurement of environmental temperature variation with the aid of the bridge input voltage and the heater 42 or other means for imparting the predetermined temperature to the strain gauge bridge 12. That amplifier 48 serves to energize the heater 42 or other means into restoration of the strain gauge bridge 12 to its predetermined temperature. As disclosed with the aid of transistor 50 and resistor 52 the preferred apparatus 10 includes means, such as that resistor 52 connected as shown in FIG. 1 or preferably as shown in FIG. 4, for exerting a temperature control on the amplifier means 48.

Where second amplifier means 40 are connected to the strain gauge bridge 12 for providing an output signal reflecting the non-thermal physical parameter, the apparatus 10 preferably includes means such as the second heating resistor 52 for exerting a temperature control on the first and second amplifier means 40 and 48. Such exerting means are in heat-transfer relationship with said amplifier means as indicated by dotted lines 56 for imparting an optimum temperature to such amplifier means, and means 50 are connected between the first amplifier means 48 and the energizable means 52 for regulating energization of such energizable means to maintenance of the optimum temperature.

The subject extensive disclosure suggests or renders apparent to those skilled in the art various modifications and variations within the spirit and scope of the subject invention and equivalents thereof.

I claim:

1. In a method of measuring a non-thermal physical parameter with temperature-sensitive means arranged in a bridge circuit including input terminals, the improvement comprising in combination the steps of:
   providing a constant voltage;
   deriving a constant current from said constant voltage;
   applying said constant current to said input terminals of the bridge circuit;
   imparting a predetermined temperature to said temperature-sensitive means;
   measuring said physical parameter with said temperature-sensitive means;
   subjecting said temperature-sensitive means to temperature variation affecting said predetermined temperature;
   employing said temperature-sensitive means themselves and a resistive circuit connected thereto for effecting a measurement of said temperature variation by sensing a change in potential difference across said input terminals due to said temperature variation and providing a signal in response to said change in potential relative to said constant voltage; and
   continuously restoring said temperature-sensitive means to said predetermined temperature in response to said signal relative to said constant voltage.

2. A method as claimed in claim 1, including the steps of:
   providing energizable means distinct from said temperature-sensitive means for imparting said predetermined temperature to said temperature-sensitive means; and
   energizing said distinct means in response to said signal relative to said constant voltage to restore said temperature-sensitive means to said predetermined temperature.

3. A method as claimed in claim 2, wherein:
   said energizable distinct means is provided around said temperature-sensitive means.

4. A method as claimed in claim 2, including the steps of:
   applying said physical parameter to said temperature-sensitive means within a predetermined region; and
   placing said energizable distinct means into heat-transfer relationship with said temperature-sensitive means, but outside said predetermined region.

5. A method as claimed in claim 4, wherein:
   said energizable distinct means is provided around said temperature-senstive means.

6. A method as claimed in claim 1, including the steps of:
   providing said temperature-sensitive means with electrically energizable elements having a temperature coefficient and being arranged in said bridge circuit;
   imparting said predetermined temperature to said elements;

applying said constant current through said input terminals to said elements;

applying said non-thermal physical parameter to said elements;

deriving from said elements an output reflecting said physical parameter;

continuously restoring said elements to said predetermined temperature in response to said signal relative to said constant voltage.

7. In a method of measuring a non-thermal physical parameter with temperature-sensitive means arranged in a bridge circuit including input terminals, the improvement comprising in combination the steps of:

providing a constant voltage;

deriving a constant current from said constant voltage;

applying said constant current to said input terminals of the bridge circuit;

heating said temperature-sensitive means to a predetermined temperature;

measuring said physical parameter with said heated temperature-sensitive means;

subjecting said heated temperature-sensitive means to temperature variation affecting said predetermined temperature;

employing said heated temperature-sensitive means themselves and a resistive circuit connected thereto for effecting a measurement of said temperature variation by sensing a change in potential difference across said input terminals due to said temperature variation and providing a signal in response to said change in potential relative to said constant voltage; and continuously restoring said temperature-sensitive means to said predetermined temperature in response to said signal relative to said constant voltage.

8. A method as claimed in claim 7, including the steps of:

providing energizable heater means distinct from said temperature-sensitive means for heating said temperature-sensitive means to said predetermined temperature; and energizing said distinct heater means in response to said signal relative to said constant voltage to restore said temperature-sensitive means to said predetermined temperature.

9. A method as claimed in claim 8, wherein:

said distinct heater means are provided around said temperature-sensitive means.

10. Apparatus for measuring a non-thermal physical parameter with temperature-sensitive means arranged in a bridge circuit including input terminal means, the improvement comprising in combination:

first means for providing a constant voltage;

second means connected to said first means for deriving a constant current from said constant voltage and for applying said constant current to said input terminal means of the bridge circuit;

third means connected to said temperature-sensitive means for measuring said physical parameter with said temperature-sensitive means;

fourth means for imparting a predetermined temperature to said temperature-sensitive means, said temperature-sensitive means being subject to temperature variation affecting said predetermined temperature;

fifth means connected to said input terminal means of the bridge circuit for sensing a change in potential difference across said input terminal means due to said temperature variation with said temperature-sensitive means themselves and providing a signal in response to said change in potential relative to said constant voltage; and sixth means connected to said fourth and fifth means for continuously restoring said temperature-sensitive means to said predetermined temperature in response to said signal relative to said constant voltage to restore said temperature-sensitive means to said predetermined temperature.

11. Apparatus as claimed in claim 10, wherein:

said fourth means include energizable means distinct from said temperature-sensitive means for imparting said predetermined temperature to said temperature-sensitive means, and means connected to said fifth and sixth means for energizing said distinct means in response to said signal relative to said constant voltage to restore said temperature-sensitive means to said predetermined temperature.

12. Apparatus as claimed in claim 11, wherein:

said energizable distinct means encompass said temperature-sensitive means.

13. Apparatus as claimed in claim 11, wherein:

said third means include means for applying said physical parameter to said temperature-sensitive means within a predetermined region; and said energizable distinct means are located outside said predetermined region in heat-transfer relationship with said temperature-sensitive means.

14. Apparatus as claimed in claim 13, wherein:

said energizable distinct means encompass said temperature-sensitive means.

15. Apparatus as claimed in claim 10, wherein:

said temperature-sensitive means include electrically energizable elements having a temperature coefficient and being arranged in said bridge circuit including said input terminal means, and means for applying said non-thermal physical parameter to said elements;

said fourth means include means coupled to said elements for imparting said predetermined temperature to said elements;

said second means include first amplifier means having a first kind of input connected to a source of electric current and having an output connected to said input terminal means for applying said constant current to said input terminal means;

said third means include means for deriving from said elements an output reflecting said physical parameter;

said sixth means include second amplifier means having a first kind of input connected to said fifth means and having an output connected to said means coupled to said elements for imparting said predetermined temperature to said elements for continuously restoring said elements to said predetermined temperature in response to said signal provided by said fifth means;

said first and second amplifier means each having a second kind of input connected to said first means providing said constant voltage.

16. Apparatus as claimed in claim 10, wherein:

said fourth means include means for heating said temperature-sensitive means to said predetermined temperature; and said six means include means for energizing said heating means to continuously restore said temperature-sensitive means to said predetermined temperature in response to said signal relative to said constant voltage.

17. Apparatus as claimed in claim 10, wherein:

said second means include energizable heater means distinct from said temperature-sensitive means for heating said temperature-sensitive means to said predetermined temperature; and said fourth means include means for energizing said distinct heater means in response to said signal relative to said voltage continuously to restore said temperature-sensitive means to said predetermined temperature.

18. Apparatus as claimed in claim 17, wherein:

said distinct heater means encompass said temperature-sensitive means.

19. Apparatus as claimed in claim 10, wherein:

said temperature-sensitive means include a resistance strain gauge bridge connected to said input terminal means, and means for applying said non-thermal physical parameter to said strain gauge bridge;

said fourth means include means in heat-transfer relationship with said strain gauge bridge for imparting said predetermined temperature to said strain gauge bridge;

said third means include means connected to said strain gauge bridge for deriving from said strain gauge bridge an output reflecting said physical parameter;

said fifth means include means connected to said strain gauge bridge for deriving from said strain gauge bridge said signal relative to said constant voltage; and said sixth means include means connected to said fifth means and to said means for imparting said predetermined temperature to said strain gauge bridge, for continuously restoring said strain gauge bridge to said predetermined temperature in response to said signal relative to said constant voltage.

20. Apparatus as claimed in claim 19, wherein:

said strain gauge bridge is located on areas of maximum strain of a diaphragm for receiving said non-thermal physical parameter; and said means for imparting said predetermined temperature to said strain gauge bridge are located outside of said maximum strain areas.

21. Apparatus as claimed in claim 19, wherein:

said sixth means include amplifier means between said fifth means and said fourth means for imparting said predetermined temperature to said strain gauge bridge, for energizing the latter means into restoration of said strain gauge bridge to said predetermined temperature; and said apparatus include means for exerting a temperature control on said amplifier means.

22. Apparatus as claimed in claim 19, wherein:

said sixth means include first amplifier means between said fifth means and said fourth means for imparting said predetermined temperature to said strain gauge bridge, for energizing the latter means into restoration of said strain gauge bridge to said predetermined temperature;

said means for deriving from said strain gauge bridge an output include second amplifier means connected to said strain gauge bridge for providing an output signal reflecting said physical parameter; and said apparatus include means for exerting a temperature control on said first and second amplifier means.

23. Apparatus as claimed in claim 22, wherein:

said exerting means include energizable means in heat-transfer relationship with said amplifier means for imparting an optimum temperature to said amplifier means, and means connected between said first amplifier means and said energizable means for regulating energization of said energizable means to maintenance of said optimum temperature.

* * * * *